United States Patent Office 3,035,945
Patented May 22, 1962

3,035,945
ELECTROLYTE
Herbert E. Lawson, Downers Grove, Ill., assignor to the United States of America as represented by the Secretary of the Navy
No Drawing. Filed Feb. 5, 1946, Ser. No. 645,630
8 Claims. (Cl. 136—154)

This invention relates to electrolytes for use in electric battery cells and has particular relation to electrolytes adapted for use in primary, one fluid type, deferred action type batteries.

The primary, one fluid type, deferred action type battery for which the electrolyte of the present invention is particularly suitable is one wherein the electrolyte is maintained out of contact with the electrodes until such time as the cell is to be used. In this type of battery, the electrolyte is normally confined in a sealed, frangible ampoule which is broken to release the electrolyte for contact with the electrodes, thereby activating the cell. Examples of batteries of this type in which the electrolyte of the present invention has been successfully used are disclosed in copending applications, Paul Marsal, Ser. No. 501,001, filed September 2, 1943, now Patent No. 3,003,016, and George M. Sommerman et al., Ser. No. 768,194, filed August 12, 1947.

Batteries of this type are well adapted for use in electrically detonated projectiles which must be shipped and stored for long periods in the wide variety of climates which may be encountered throughout the world. Thus it is evident that electrolytes employed in deferred action batteries for use in electrically detonated projectiles must meet unusual requirements; that is, they should be made chemically stable for long periods and should not decompose or form deposits or precipitates either at normal temperatures or at extreme temperatures. Furthermore, electrolytes of this type should not give off any appreciable amount of gas which might diminish or even exhaust the strength of the electrolyte. In addition, electrolytes of this type which are contained in a sealed, frangible ampoule, should not produce an amount of gas pressure which would be sufficient to burst the ampoule, thereby activating the battery prematurely and possibly resulting in accidental detonation of the projectile.

The electrolyte of the present invention generally comprises an aqueous solution of chromic trioxide ($CrO_3$) and a suitable metal chloride. More particularly, the electrolyte of the present invention comprises water, chromic trioxide, and a chloride, preferably stannic chloride, although chromic chloride, cupric chloride, aluminum chloride, sodium chloride or lithium chloride may be used.

An object of the present invention is to provide an electrolyte which will be satisfactory for use in primary, one-fluid deferred action type batteries.

Another object of the invention is to provide an electrolyte which is capable of being shipped and stored for long periods at extreme temperatures in a frangible, sealed ampoule.

A further object of the invention is to provide an electrolyte which is capable of being stored in a sealed container for long periods at extreme temperatures and is capable of being subjected to considerable agitation without decomposing to form deposits, precipitates, or gas.

Still another object of the invention is to provide an electrolyte which will be capable of instantaneously activating a primary cell when the cell electrodes are contacted by the electrolyte.

A still further object is to provide an electrolyte which will not form a deposit or precipitate when subjected to intense centrifugal force, such as is imparted to a projectile when it is fired from a rifled gun barrel.

These and other objects of the invention will be understood by reference to the accompanying description.

Electrolytes consisting of an aqueous solution of chromic acid are known. One such electrolyte for use in a primary cell having a magnesium anode is disclosed in U.S. Patent 2,301,390 issued on November 10, 1942. However, aqueous solutions of chromic acid have heretofore been considered incompatible with metal chlorides as additional ingredients, for use as electrolytes for battery cells, for the reason that reactions of an oxidation-reduction nature would take place and result in the liberation of an excessive amount of free chlorine. Furthermore, it is well known that in a battery employing a magnesium anode, with a cooperating cathode and activated by an aqueous solution of chromic acid, the addition of small amounts of inorganic acids or salts to the aqueous chromic acid solution either causes the said electrolyte to attack the magnesium anode by direct chemical action or results in the electrolyte forming an impervious coating on the magnesium anode during operation of the battery.

Contrary to all expectations, it has been found that an electrolyte comprising chromium trioxide, stannic chloride and water will satisfactorily activate a primary cell. Although the new electrolyte may be employed for activating primary cells having a conventional anode, such as magnesium and a suitable cooperating cathode, particular success has been achieved with the new electrolyte in a primary cell having zinc and carbon electrodes, such as those disclosed in the aforementioned copending applications.

One preferred composition of the new electrolyte is shown in the following example:

Example 1

|  | Percent by weight |
|---|---|
| Chromic trioxide (chromic acid)—$CrO_3$ | 15 |
| Stannic chloride (tetravalent form)—$SnCl_4 \cdot 5H_2O$ | 40 |
| Water | 45 |

Another composition which has proven very satisfactory is as follows:

Example 2

|  | Percent by weight |
|---|---|
| Chromic trioxide (chromic acid)—$CrO_3$ | 21.5 |
| Stannic chloride (tetravalent form)—$SnCl_4 \cdot 5H_2O$ | 29 |
| Water | 49.5 |

The electrolytes shown in the above examples were stored for two months in sealed, frangible ampoules at the relatively high temperature of 120° F. At the end of two months, the ampoules were fractured to determine whether or not any chlorine gas had been generated by the electrolyte and it was determined that merely a faint odor of chlorine had been produced. Identical samples were also stored in the same manner to determine the extent of precipitation and it was found that no precipitate was formed by the electrolyte shown in Example 1, while the electrolyte shown in Example 2 exhibited merely a slight trace of precipitates.

Other electrolytes shown in Examples 1 and 2 above were placed in a closed container having a gas vent connected to a gas pressure measuring device. The electrolyte was heated to 150° F. in order to determine the amount and pressure of gas evolved and it was found that the electrolyte shown in Example 2 evolved a small amount of gas whereas the electrolyte of Example 1 was relatively free from this disadvantage.

In order to simulate the conditions to which the present electrolyte would be subjected when fired from a rifle gun barrel in a projectile, the electrolytes of Examples 1 and 2 were placed in sealed ampoules and subjected to spinning; that is, centrifugal force of the high order present in a spinning projectile. It was found that no deposit or precipitate was thrown out of the solution even when it was subjected to an intense centrifugal force. In this connection, an electrolyte which forms a deposit or precipitate when subjected to centrifugal force would be detrimental and undesirable in primary batteries of the type disclosed in copending application Ser. No. 501,001. Primary cells of this type are provided with narrow spaces between the electrode elements. An electrolyte containing deposits or precipitates would clog up these narrow spaces and thereby impede the free flow of electrolyte and thus retard or prevent activation of the cell. In cells of this type, the electrolyte is dispersed throughout the cell elements by means of centrifugal force imparted to the electrolyte by the projectile in which the primary cell is contained.

In general, the electrolyte of the present invention possesses the following desirable characteristics:

(a) Stable composition.
(b) Low freezing point.
(c) Generation of peak voltages reasonably independent of temperature changes.
(d) Freedom from excessive gassing and pressure generation.
(e) Freedom from deposition and precipitation due to extended shelf storage at extreme temperatures.
(f) Capable of instantaneously activating the cells.
(g) Reasonable long shelf life when stored in a sealed container.
(h) Adequately short activation period when contacting electrode elements of the cell.

While the percentages of the electrolytes shown in Examples 1 and 2 above are preferred, the percentages of the components may be varied within limits. Thus it has been found that the percentage of the components may be varied within the following limits:

| | Percent by weight |
|---|---|
| Chromic trioxide ($CrO_3$) | From 10 to 30 |
| Stannic chloride ($SnCl_4 \cdot 5H_2O$) | From 25 to 55 |
| Water | From 30 to 55 |

In this connection it has been found that if less than approximately 25% by weight of stannic chloride is used, or if an amount more than approximately 55% by weight is used, the desirable characteristics recited above are either impaired or lost.

Although stannic chloride ($SnCl_4 \cdot 5H_2O$) has been found most satisfactory, other metal chlorides may be used although they are not fully equivalent to stannic chloride in all respects. The following examples illustrate other metal chlorides which have been successfully used in place of stannic chloride in the present electrolyte. The percentages of the coponents shown illustrate the preferred percentage compositions which may be varied within limits.

*Example 3*

| | Percent by wt. |
|---|---|
| Chromic trioxide ($CrO_3$) | 21.6 |
| Chromic chloride ($CrCl_3 \cdot 6H_2O$) | 29.6 |
| Water | 48.8 |

*Example 4*

| | |
|---|---|
| Chromic trioxide ($CrO_3$) | 21.6 |
| Aluminum chloride ($AlCl_3 \cdot 6H_2O$) | 26.7 |
| Water | 51.7 |

*Example 5*

| | |
|---|---|
| Chromic trioxide ($CrO_3$) | 21.6 |
| Cupric chloride ($CuCl_2 \cdot 2H_2O$) | 28.2 |
| Water | 50.2 |

*Example 6*

| | |
|---|---|
| Chromic trioxide ($CrO_3$) | 21.6 |
| Sodium chloride (NaCl) | 19.3 |
| Water | 59.1 |

*Example 7*

| | |
|---|---|
| Chromic trioxide ($CrO_3$) | 21.6 |
| Lithium chloride (LiCl) | 14.0 |
| Water | 64.4 |

Of the above group of metal chlorides, chromic chloride and aluminum chloride gave the best results when tested in accordance with the procedure used for testing the electrolytes shown in Eaxmples 1 and 2. As previously stated, the percentage compositions shown in Examples 3 to 7 inclusive may be varied within limits. It will be noted that the chromic trioxide content by weight is approximately the same for the electrolytes shown in Examples 2 to 7 inclusive. It will also be evident that the actual chlorine content of these metallic salts is identical for all these examples of the present electrolyte. Accordingly, the percentage composition of the metallic salts in the electrolytes shown in Examples 3 to 7 inclusive may be varied, proportional to their chlorine content, within the same limits as those prescribed for the stannic chloride. Thus, the limits of chlorine content, which corresponds to the prescribed percentage range of stannic chloride and which determines the percentage ranges of the other metallic salts illustrated in Examples 3 to 7, is 10% to 22% by weight of the electrolyte.

What is claimed is:

1. An electrolyte for battery cells, comprising by weight approximately from 10 to 30% chromic trioxide, 25 to 55% stannic chloride of the composition $SnCl_4 \cdot 5H_2O$ and water sufficient to make up to 100%.

2. An electrolyte for battery cells, comprising by weight approximately 40% stannic chloride of the composition $SnCl_4 \cdot 5H_2O$, 15% chromic trioxide and sufficient water to make up to 100%.

3. An electrolyte for battery cells, comprising by weight approximately 29% stannic chloride of the composition $SnCl_4 \cdot 5H_2O$, 21.5% chromic trioxide and sufficient water to make up to 100%.

4. An electrolyte for battery cells, comprising approximately 10 to 30% by weight of chromic trioxide, a chloride of a metal selected from the group consisting of the monovalent metals sodium and lithium, the divalent metal copper, the trivalent metals aluminum and chromium, and the tetravalent metal tin, said chloride having a chlorine content constituting approximately 10 to 22% by weight of the electrolyte, and sufficient water to make up to 100%.

5. An electrolyte for battery cells, comprising by weight approximately 29.6% chromic chloride of the composition $CrCl_3 \cdot 6H_2O$, 21.6% chromic trioxide, and sufficient water to make up to 100%.

6. An electrolyte for battery cells, comprising by weight approximately 26.7% aluminum chloride of the composition $AlCl_3 \cdot 6H_2O$, 21.6% chromic trioxide, and sufficient water to make up to 100%.

7. An electrolyte for battery cells, comprising by weight approximately 28.2% cupric chloride of the compositio $CuCl_2 \cdot 2H_2O$, 21.6% chromic trioxide, and sufficient water to make up to 100%.

8. An electrolyte for battery cells, comprising by weight approximately 14% lithium chloride of the composition LiCl, 21.6% chromic trioxide, and sufficient water to make up to 100%.

References Cited in the file of this patent

UNITED STATES PATENTS

| 397,526 | Thompson | Feb. 12, 1889 |
| 706,631 | Anderson | Aug. 12, 1902 |
| 1,839,498 | Porth | Jan. 5, 1932 |
| 2,257,130 | Ruben | Sept. 30, 1941 |

FOREIGN PATENTS

| 3,799 | Great Britain | May 9, 1891 |

OTHER REFERENCES

Allemand, A. J.: Principles of Applied Electrochemistry (1924), page 210.